Figure 1:
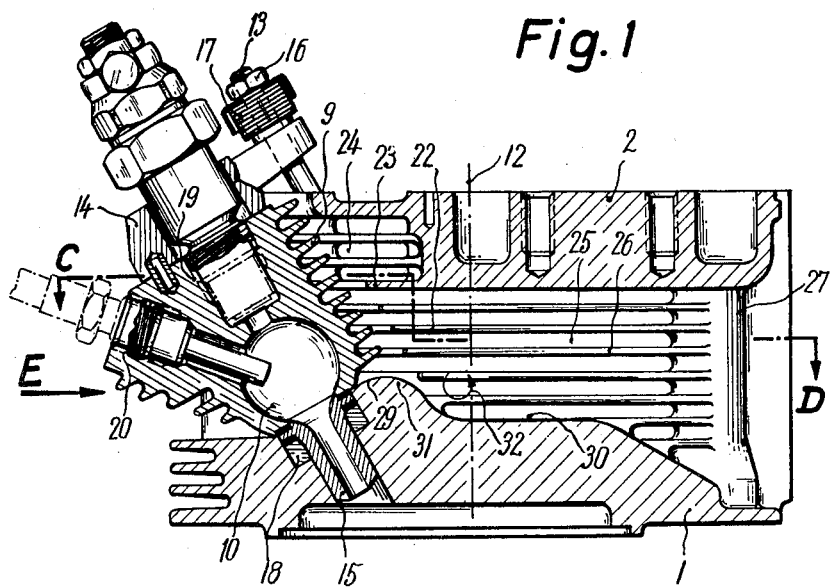

May 14, 1963  F. ESPENSCHIED  3,089,471
CYLINDER HEADS FOR INTERNAL COMBUSTION ENGINES
Filed Oct. 6, 1960

United States Patent Office 3,089,471
Patented May 14, 1963

3,089,471
CYLINDER HEADS FOR INTERNAL COMBUSTION ENGINES
Friedrich Espenschied, Mannheim, Germany, assignor to Motoren-Werke Mannheim A.G. vorm. Benz Abt. Stat. Motorenbau, Mannheim, Germany, a German company
Filed Oct. 6, 1960, Ser. No. 60,959
Claims priority, application Germany Oct. 10, 1959
2 Claims. (Cl. 123—32)

This invention relates to cylinder heads for air-cooled injection internal combustion engines, which comprise a base plate for confining the cylinder space, and a top part which is formed as a rocker box and is connected to the base plate by partitions. The cylinder head to which the invention relates is adapted for use with an overhead valve engine and has inlet and outlet ducts forming parts of the partitions. In addition there is a central cooling-air tunnel, situated between the partitions and extending over the central part of the base plate, as well as a combustion chamber, which is mounted on a cooling-air approach side of the head in a manner minimizing heat-conducting contact surfaces with the actual cylinder head. The combustion chamber is provided with fins extending obliquely of the cylinder axis and pointing in the direction of cooling air flow towards said top part. Said chamber is enclosed by guide walls which extend substantially in the direction of the approaching cooling-air current and confine inner cooling-air ducts adjacent the combustion chamber, which ducts are partly filled with fins and are partly open.

In such cylinder heads, the rate of flow of cooling air through the inner cooling-air ducts, for a given blower pressure, depends substantially on the cross-section of the central cooling-air tunnel which, however, is very small in the case of high-speed, light diesel engines having a small cylinder spacing. However, based on the cross-section of the inner cooling-air ducts confined by the guide walls adjacent the combustion chamber, a higher rate of flow of cooling air would be possible, which would have an advantageous effect on the cooling of the combustion chamber.

It is the object of the invention to make this increase in the rate of flow of cooling air possible in a simple manner.

According to the invention there is provided a cylinder head for an overhead valve air-cooled injection internal combustion engine, comprising a base plate for confining the cylinder space, a top part which is formed as a rocker box and is connected to the base plate by partitions which form inlet and exhaust valve ducts there being a central cooling-air tunnel, situated between the partitions and extending over the central part of the base plate, and a combustion chamber which is mounted on a cooling-air approach side of the head in a manner minimizing heat-conducting contact surfaces with the actual cylinder head, the combustion chamber being provided with fins extending obliquely of the cylinder axis and pointing in the direction of cooling air flow towards said top part, the chamber being enclosed by inlet guide walls which extend substantially in the direction of the approaching cooling-air current, and confine inner cooling-air ducts adjacent the combustion chamber, which ducts are partly filled with fins and are partly open, wherein the inner cooling-air ducts are in communication with openings in the guide walls, which openings are situated substantially at a transition of the guide walls into the valve duct walls, and open into outer cooling-air ducts situated on the outer, longitudinal sides of the cylinder head, the arrangement being such that a part of cooling air flowing between the guide walls flows through the openings, and another part flows through the central cooling-air tunnel. Thus the invention provides an additional discharge path for the cooling air, so that the cross-section of the inner cooling-air ducts adjacent the combustion chamber can be fully utilized for carrying cooling air, since there is no further constriction in the subsequent course of the cooling-air paths.

Figure 2:
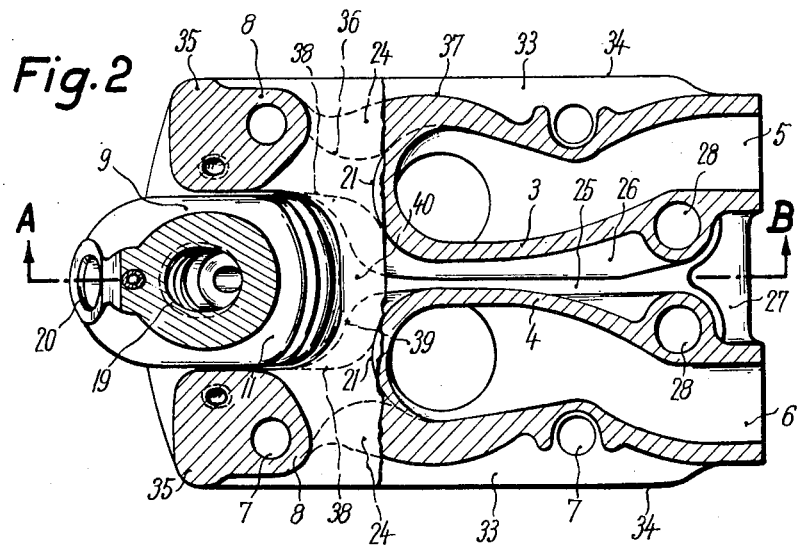

For a better understanding of the invention and to show how the same may be carried into effect, reference will now be made, by way of example, to the accompanying drawing, in which:

FIGURE 1 is a sectional view on line A—B in FIGURE 2 of the cylinder head of an overhead valve air-cooled injection internal combustion engine, and FIGURE 2 is a section on the line C—D in FIGURE 1.

The cylinder head consists of a base plate 1 and a top part 2 serving as a rocker box. The top part 2 and base plate 1 are connected together by partitions 3 and 4, in which are included an exhaust valve duct 5 and an inlet valve duct 6. Holes 7 are provided in the partitions 3 and 4 for fixing bolts (not shown) for connecting the cylinder head to the cylinder (likewise not shown). On the approach side of the cooling air which flows in the direction of the arrow E, the partitions 3 and 4 terminate in inlet guide walls 8, surrounding a combustion chamber 10 provided with fins 9, while leaving free inner cooling-air ducts 11. The fins 9 extend obliquely to the cylinder axis 12 and, viewed in the direction of flow of the cooling air, point towards the top part 2. The combustion chamber 10 is situated on the cooling-air approach side and is connected to the cylinder head in a manner substantially eliminating heat-conducting surfaces of contact. In the present case, the combustion chamber 10 is pressed on to a burner insert 15 by means of two bolts, screwed in the guide walls 8, with the assistance of a bridge 14. Screwed on bolts 13 are nuts 16 which by means of spring ring assemblies 17 transmit the press-on pressure to the bridge 14. The burner insert 15 constitutes a constriction between the combustion chamber interior and the cylinder space and rests on a reinforcing ring 18. The combustion chamber 10 is provided with a threaded bore 19 for an injection nozzle and a similar bore 20 for a hot plug. The cylinder head is made of light metal, while individual highly-stressed parts are made of iron. The combustion chamber 10 is made of cast iron. The inner cooling-air ducts 11 encounter the walls 21 of the ducts 5 and 6, which are provided with fins 22 extending in a plane perpendicular to the cylinder axis 12. In prolongation of the lower side of the top part 2, also in a plane perpendicular to the cylinder axis 12 is a guide fin 23, which divides the air flowing past the combustion chamber 10 into a cooling-air current flowing through openings 24 and into a cooling-air current flowing through a central cooling-air tunnel 25. The central cooling-air tunnel 25, which is situated between the partitions 3 and 4, is provided with short guide fins 26, extending in planes perpendicular to the cylinder axis only so far as to leave an open passage cross-section free from fins. The fins 26 may be omitted from one of the two ducts 5 and 6 or from both ducts. At the outlet end 27 of the central cooling-air tunnel 25 are bores 28 for the valve push-rods, the linings of which form part of the walls of the ducts 5 and 6. The surface 29 of the bottom plate 1 in the region of the burner insert 15 extends parallel to the fins 9 and forms a bend 31 situated at the inlet side of the central cooling-air tunnel 25 in front of the web part 30. Between the flange of the insert 15 and the guide walls 8 in the vicinity of the part 29, a particularly powerful cold cooling-air current strikes the bottom guide fin pair 22, is deflected into the central cooling-air tunnel 25 and forms behind the bend 31 a swirl 32 which cools the web part 30. The openings 24 are situated at the transition of the guide walls 8 into the walls 21 of the ducts 5 and 6. They open into outer cooling-air ducts 33, situated on the longitudinal sides 34 of the cylinder head. The inner cooling-air ducts 11 are in communication with the openings 24, so that part of the cooling air which sweeps past the guide walls 8 flows away laterally through the openings 24 into the outer cooling-air ducts 33. Another part of the cooling air flows through the central cooling-air tunnel 25. The openings 24 are situated in the region of the top part 2, and the outer cooling-air ducts 33 have their maximum width in the region of the openings 24. On the cooling-air approach side of the guide walls 8 thickened portions 35 are provided, which at least almost block the admission of cooling air to the outer cooling-air ducts 33 and least in the region of the openings 24. The cooling-air flow passes in front of the cylinder head in the direction of the arrow E in the region of the inner and outer cooling air ducts 11 and 33 and in the region of the combustion chamber 10 in the direction of the fins situated at those places. The dash-lines 36 and 37 indicate the boundary of the outer cooling-air ducts 33, the line 36 indicating the course at the level of the left-hand part of the section C—D, and the line 37 at the level of the right-hand part of said section. The course of the edge of the fin 22, situated below the fin 23, is indicated by the line 39. The edges of all the fins 22 extend substantially parallel thereto, forming in each case an interruption 40, in which cooling air can flow substantially parallel to the cylinder axis. The inner contours of the guide walls are indicated by the lines 38. The outer cooling-air ducts 33, apart from the boundaries 36 and 37 may also be confined by the corresponding parts of adjacent cylinder heads, or by cooling-air guide plates, not shown, lying against the longitudinal sides 34.

I claim:

1. An air-cooled cylinder head of box-like formation comprising a base plate in which are provided an inlet and an exhaust port, an upper portion constituting a rocker box, connecting walls rigidly linking said base plate and upper portion, there being intake and exhaust channels provided in said walls and communicating with said ports, said base plate, said rocker box and said connecting walls forming together an integral structure and defining a central cooling air channel extending from a point near the center of said cylinder head to a cooling air outlet side of said cylinder head, said head comprising further an auxiliary combustion chamber having a lower face, there being a counterface on said base plate, means fastening said chamber with its lower face detachably in contact with the counterface on said base plate, said lower face lying on a cooling air inlet side of said head, said lower face having an area which is a small fraction of the whole outer surface of said auxiliary combustion chamber, guide walls on said inlet side of said head, said guide walls being in spaced relationship with the whole outer surface of said auxiliary combustion chamber and partially surrounding said auxiliary chamber, said guide walls being integral with said connecting walls and extending in the direction of the incoming cooling air stream, there being inner cooling air passages provided between said guide walls and the walls of said combustion chamber, said inner passages extending from said cooling air inlet side of said cylinder head to said point near the center of said cylinder head and thus surrounding said auxiliary chamber, said head comprising furthermore outer surfaces on said connecting walls and said guide walls, said outer surfaces forming parts of the walls of outer cooling air channels which extend from said cooling air inlet side of said head to said cooling air outlet side of said head, said inner passages having a lower portion and an upper portion, said lower portion constituting a cooling air duct extending from said cooling air inlet side of said base plate over the surface of said base plate near said counterface around said chamber and communicating with said central channel, said upper portion lying in the vicinity of said rocker box, said guide walls having lateral openings only in the vicinity of said rocker box, said openings connecting said upper portion with said outer channels, means for directing an upper part of said incoming cooling air stream which flows through said upper portion of said inner passages to flow chiefly from said upper portion through said openings into said outer cooling air channels, means for directing a lower part of said incoming cooling air stream which flows through said lower portion of said inner passages to flow chiefly from said lower portion into said central channel, and means for cooling said auxiliary chamber under the influence of said upper and lower parts of said incoming cooling air stream, said means for cooling said auxiliary chamber being constituted by fins protruding from said chamber, said fins lying substantially in planes which appear to be perpendicular to the cylinder axis in a transverse section of said head and appear inclined with respect to said axis in a longitudinal section of said head, so as to point towards said rocker box.

2. An air-cooled cylinder head according to claim 1, wherein said outer surfaces have protuberances thereon, the protuberances being disposed on said cooling air inlet side of said cylinder head, said protuberances extending substantially over the total transverse width of said cylinder head, said protuberances restricting said incoming cooling air stream from passing along said outer surfaces from the cooling air inlet side of said cylinder head to the cooling air outlet side of said head.

References Cited in the file of this patent

UNITED STATES PATENTS

| | | |
|---|---|---|
| 2,584,289 | Rabe | Feb. 5, 1952 |
| 2,725,045 | Flatz et al. | Nov. 29, 1955 |

FOREIGN PATENTS

| | | |
|---|---|---|
| 179,150 | Austria | July 26, 1954 |

OTHER REFERENCES

Niedermayer, German application, printed Dec. 31, 1958, No. 1,048,078 (Kl. 46 C' 4), 3 pp. spec., 6 shts. drg.